(12) United States Patent
Littrell

(10) Patent No.: US 7,525,443 B2
(45) Date of Patent: Apr. 28, 2009

(54) METHOD AND APPARATUS FOR MACHINE STATE QUANTIFICATION IN MACHINERY MANAGEMENT SYSTEMS

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 585 days.

(21) Appl. No.: 11/164,689

(22) Filed: Dec. 1, 2005

(65) Prior Publication Data

US 2007/0126592 A1 Jun. 7, 2007

(51) Int. Cl.
*G08B 21/00* (2006.01)

(52) U.S. Cl. .................. 340/679; 340/449; 340/648; 340/684; 318/139; 318/434

(58) Field of Classification Search ............... 340/679, 340/449, 684, 648; 318/139, 161, 434
See application file for complete search history.

(56) References Cited

U.S. PATENT DOCUMENTS

| | | | |
|---|---|---|---|
| 5,905,989 A | 5/1999 | Biggs | |
| 6,421,571 B1 | 7/2002 | Spriggs et al. | |
| 6,615,785 B2 * | 9/2003 | Weiss | 123/179.28 |
| 6,639,370 B1 * | 10/2003 | Gabrys | 318/161 |
| 6,775,576 B2 | 8/2004 | Spriggs et al. | |
| 6,789,030 B1 | 9/2004 | Coyle et al. | |
| 6,889,096 B2 | 5/2005 | Spriggs et al. | |
| 6,934,696 B1 | 8/2005 | Williams et al. | |
| 7,030,746 B2 * | 4/2006 | Littrell et al. | 340/500 |
| 7,245,983 B2 * | 7/2007 | Suzuki et al. | 700/177 |
| 7,298,102 B2 * | 11/2007 | Sopko et al. | 318/139 |
| 2002/0163427 A1 | 11/2002 | Eryurek et al. | |
| 2003/0023518 A1 | 1/2003 | Spriggs et al. | |
| 2003/0028269 A1 | 2/2003 | Spriggs et al. | |
| 2004/0024662 A1 | 2/2004 | Gray et al. | |
| 2004/0104946 A1 | 6/2004 | Li | |
| 2004/0133853 A1 | 7/2004 | Poerner et al. | |
| 2004/0204775 A1 | 10/2004 | Keyes et al. | |
| 2005/0007249 A1 | 1/2005 | Eryurek et al. | |
| 2005/0231350 A1 | 10/2005 | Littrell et al. | |
| 2005/0246593 A1 | 11/2005 | Littrell | |

\* cited by examiner

*Primary Examiner*—Davetta W Goins
(74) *Attorney, Agent, or Firm*—Cantor Colburn LLP

(57) ABSTRACT

A method for determining a steady state operating condition of a machine includes determining whether a current machine speed of the machine is within a defined range of operation, determining whether a step change in output power of the machine has occurred, determining a first duration of time elapsed since the machine speed was last outside of the defined range of operation, and determining a second duration of time elapsed since a most recent detected step change in output power of the machine. The machine is deemed to be in a steady state condition whenever the current machine speed of the machine is within said defined range of operation, and the first and second durations of time exceed respective minimum values defined therefor.

28 Claims, 6 Drawing Sheets

METHOD AND APPARATUS FOR MACHINE STATE QUANTIFICATION IN MACHINERY MANAGEMENT SYSTEMS

BACKGROUND OF THE INVENTION

The present disclosure relates generally to plant asset management systems and, more particularly, to a method and apparatus for machine state quantification in machinery management systems.

Early notification of malfunctions or other alarm conditions in a machine or process assists operators in reacting to and curing the malfunction or condition. Such early warning of malfunctions is particularly important for machines and processes used in, for example, nuclear power plants, oil refineries, conventional power plants, pipeline pumping stations, manufacturing facilities, aircraft engines and in other critical facilities and applications. Early detection of a malfunction may allow an operator to prevent extensive damage to machines, stop a potentially dangerous condition, and maintain efficient and continuous operation.

Sensors that monitor various machine conditions (e.g., vibration, temperature, flow pressure, lubrication flow and power output and/or demand) are well known. Based on the data from the sensors, machine controllers determine whether a malfunction has occurred or if conditions in the machine are ripe for a malfunction. The controllers may also apply threshold levels to the sensor data to determine if the machine condition exceeds a desired level. If the threshold level is exceeded by the sensor data, then the controller may generate an alarm condition. However, if the threshold level is set too high, the machine may have already malfunctioned and be damaged by the time the controller issues an alarm. On the other hand, if the threshold level is too low, the controller may issue too many false alarms.

In addition, Plant Asset Management (PAM) software is also used to provide high-level notifications of possible machinery problems. As a practical matter, such warnings should be credible or the operators/users of the system will not pay attention to the warnings. It is common for machinery operators to get in the habit of acknowledging warning messages without follow up when the messages frequently turn out to be invalid. Thus, reducing the software's propensity to "cry wolf" is an important feature for a valuable product.

Certain turbine control systems (e.g., Mark V, Mark VI by General Electric) implement logic that controls whether a machine is shut down based on vibration. This logic sometimes has "permissives" embedded therein that qualify an algorithm output based on time at running speed, and whether the unit is within an acceptance window for generator output (i.e., load). This permissive strategy is invisible to the customer, as is nearly all internal functions of the control system. It would be desirable to be able to improve the quality of automated machinery management by applying additional criteria to deterministic rules that reduce the number of incorrect machine malfunction notifications. It is further desirable for the deterministic rules to be able to handle criteria for steady state load by evaluating past changes, rather than being guided by a simple acceptance range. A steady state operating condition is significant, since machine vibration or other parameters can vary while the machine settles into a given operating mode. This settling can be a normal phenomenon not warranting an alarm condition.

BRIEF DESCRIPTION OF THE INVENTION

In one embodiment, a method for determining a steady state operating condition of a machine includes determining whether a current machine speed of the machine is within a defined range of operation, determining whether a step change in output power of the machine has occurred, determining a first duration of time elapsed since the machine speed was last outside of the defined range of operation, and determining a second duration of time elapsed since a most recent detected step change in output power of the machine. The machine is deemed to be in a steady state condition whenever the current machine speed of the machine is within said defined range of operation, and the first and second durations of time exceed respective minimum values defined therefor.

In another embodiment, a method for generating an alarm indication for a machine control system includes detecting an alarm condition within the system, determining whether a machine controlled by the control system is operating in a steady state condition, and initiating an alarm signal responsive to the detected alarm condition where the machine is operating in a steady state condition and preventing an alarm signal where the machine is not operating in a steady state condition.

In another embodiment, a controller for determining a steady state operating condition of a machine includes an algorithm configured for receiving a current machine speed and a current machine power output as inputs thereto. The algorithm is further configured for determining whether the current machine speed is within a defined range of operation, determining whether a step change in output power of the machine has occurred, determining a first duration of time elapsed since said the machine speed was last outside of said defined range of operation, and determining a second duration of time elapsed since a most recent detected step change in output power of the machine. The machine is deemed to be in a steady state condition whenever the current machine speed of the machine is within the defined range of operation, and the first and second durations of time exceed respective minimum values defined therefor.

In still another embodiment, a storage medium includes a machine readable computer program code for determining a steady state operating condition of a machine and instructions for causing a computer to implement a method. The method further includes determining whether a current machine speed of the machine is within a defined range of operation, determining whether a step change in output power of the machine has occurred, determining a first duration of time elapsed since the machine speed was last outside of the defined range of operation, and determining a second duration of time elapsed since a most recent detected step change in output power of the machine. The machine is deemed to be in a steady state condition whenever the current machine speed of the machine is within the defined range of operation, and the first and second durations of time exceed respective minimum values defined therefor.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a method and system for reducing spurious machinery management warnings from asset care software by qualifying data as steady state (or not). Certain control algorithms intended to identify defects at steady state operating conditions will also trip during transient operation such as, for example, startup and shutdown of the machine. In this instance, an alarm would be considered to be a nuisance alarm. In an exemplary embodiment, the steady state determination methodology may be incorporated into an existing machinery management system such as Bently Nevada Decision Supports® for example, or may be implemented as a discrete item that is separately configured with respect to an existing machine control system.

Briefly stated, the present disclosure implements a combination of individual rules that are logically combined in order to produce a true/false output indicative of a steady state operation condition. In an exemplary embodiment, "steady state" is defined herein as a machine operating at full speed (i.e., the shaft speed is within an acceptance window) for a selected amount of time, while the machine power output has been steady (i.e., no step changes) for another selected amount of time.

Figure 1:
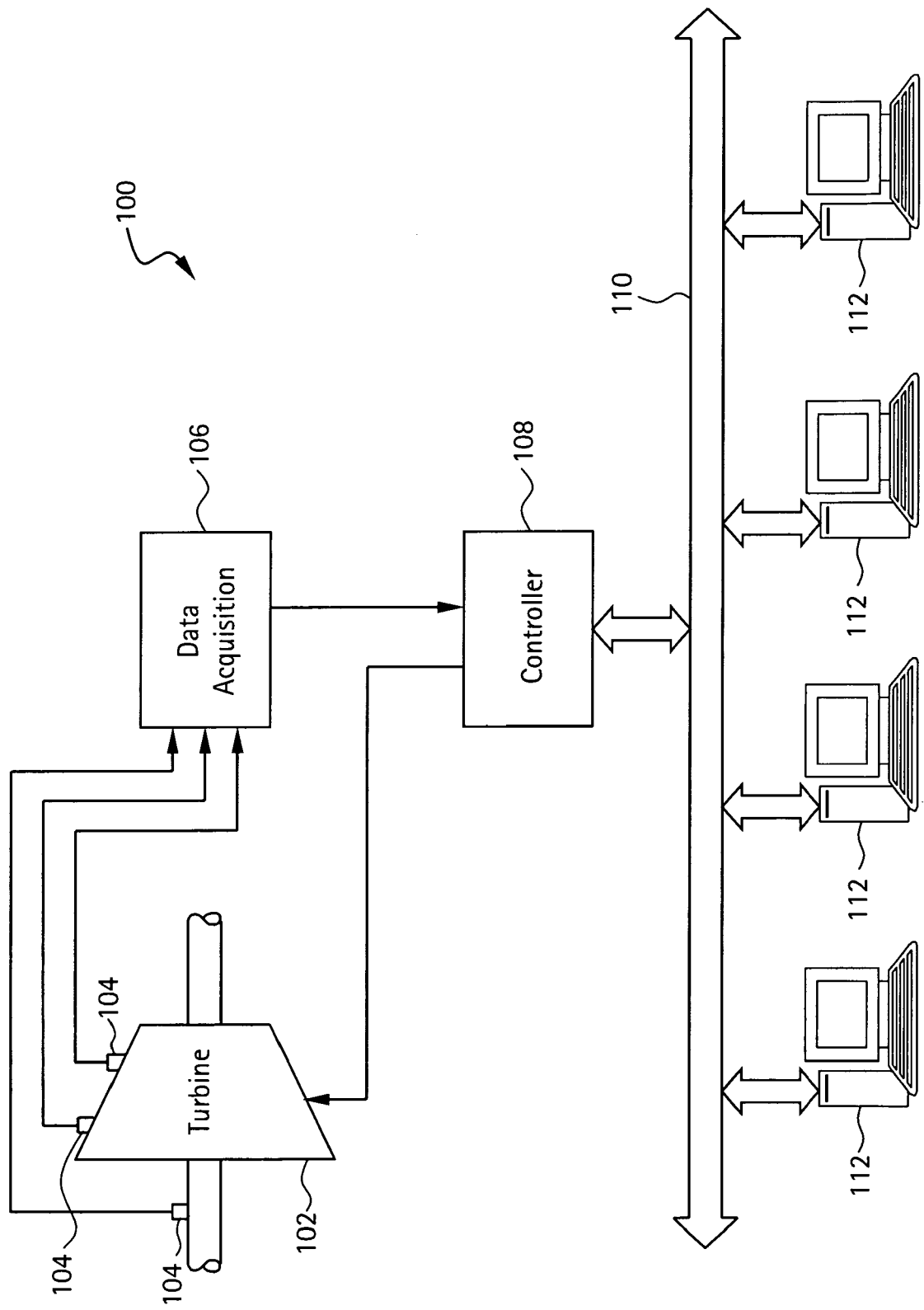
FIG. 1 is a schematic block diagram an exemplary machine control system suitable for use in accordance with an embodiment of the invention.

FIG. 1 is a schematic block diagram an exemplary machine control system 100 suitable for use in accordance with an embodiment of the invention. As is shown, an industrial machine or apparatus (e.g., turbine 102) may be characterized by various operating conditions (e.g., pressure, temperature, position, acceleration, velocity, power, current, flow, etc.). Sensor data regarding one or more of these operating conditions is collected through sensors 104 and received, for example, by a data acquisition system 106 in communication with a controller 108. The data acquisition system 106 may be embodied by networked hardware, a portable data collection unit, an internal computer or controller, or a data acquisition card in a computer system.

The controller 108 implements inputs from operators regarding desired machine operational modes, receives sensor and other inputs regarding operating conditions of the machine 102, and may generate commands to set operating parameters of the machine 102. In addition, the controller 108 may output information regarding machine operational conditions, through a network communication bus 110 (e.g., LAN, WAN, internet), to one or more client nodes 112. For example, the controller 108 may generate an alarm(s) whenever a machine malfunction or other such condition is detected. In addition, the controller 108 may be embodied by a computer system (e.g., a microprocessor, microcontroller or other computer system) having a processor that executes memory-stored control algorithms included therein. Further, the controller 108 may be locally configured with respect to the machine 102 or at a location remote to the machine.

Figure 2:
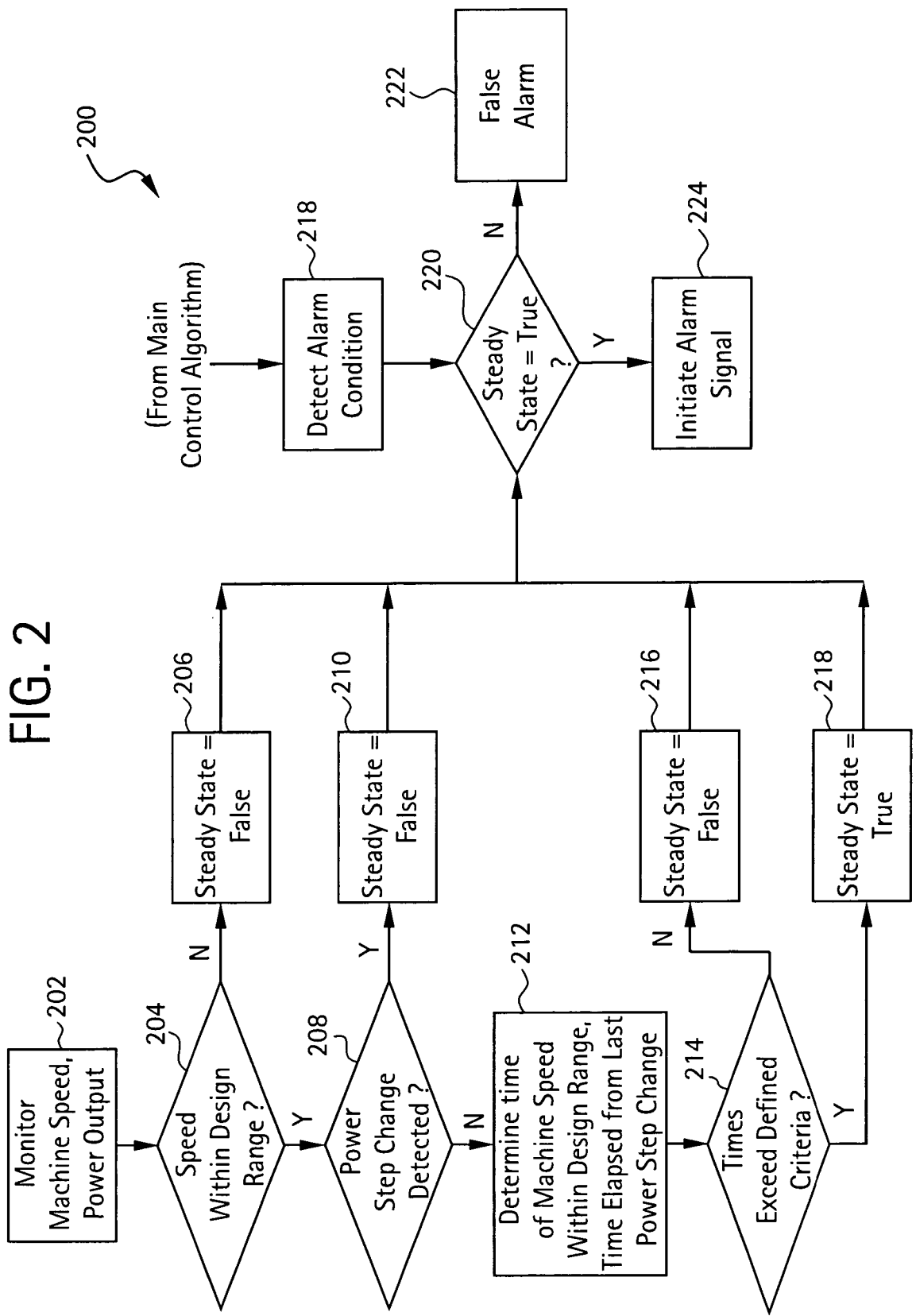
FIG. 2 is a flow diagram of a method for determining a steady state operating condition of a machine in accordance with an embodiment of the invention.

Referring now to FIG. 2, there is shown a flow diagram 200 of a method for determining a steady state operating condition of a machine (such as a turbine for example) in accordance with an embodiment of the invention. The determination of a steady state operation may be used, for example, to enable an alarm condition that would otherwise be triggered by the machine control software. In other words, in the absence of a determined steady state operation condition, an alarm condition is not triggered so as to avoid a false alarm situation that may be associated with a machine that is not in a steady state condition.

In the exemplary embodiments illustrated, the main parameters used in determining a steady state condition are machine speed and power output. It will be appreciated, however, that other parameters could also be used in defining a "steady state" condition. As initially indicated in block 202, the determination algorithm 200 monitors machine speed and power output. In the case of power output, readings may stored within a buffer that continuously records the most recent power output values taken at a predetermined interval over a predetermined period of time (e.g., 60 FIFO buffer entries recording the most current power output values over a period of 1 hour, taken at 1 minute intervals).

In accordance with a first steady state determination rule, process 200 determines at block 204 whether the present machine speed is within a certain percentage of design speed of the machine. The specific percentage (range) may be specified by the user of the system. For example, if the rated design speed of a turbine is 3600 rpm, and the specified range of operation for steady state purposes were ±20%, then block 204 determines whether the present machine speed is within the range of 2880 rpm to 4320. If this is not the case, then the machine is deemed not to be in a steady state operation condition and the binary steady state output value of the algorithm 200 is "False" as shown at block 206.

On the other hand, if the machine is operating within the specified speed range, then a further inquiry is made as to the determination of an output power step change, as shown at block 208. Output power is a particularly suitable parameter on which to base a determination of a steady state condition, as it is indicative of the heat load on the machine. If there is a significant change in output power of the machine, then the machine is deemed at that point not to be in a steady state operation condition and the binary steady state output value of the algorithm 200 is "False" as shown at block 210. A specific example of defining and determining a "step change" in power output is discussed hereinafter.

It should be appreciated that the speed and power output inquires need not literally be executed in a "sequential" fashion as depicted by the exemplary flow diagram in FIG. 2. In other words, the binary output of the steady state algorithm 200 is dynamically subject to change, based on an instantaneous change in one or more of the simultaneously measured parameters. As such, FIG. 2 represents a depiction of the functional logic utilized by the algorithm 200, and should not necessarily be construed as performing specific steps in a specific sequence.

Even where machine speed is currently within the specified range and there is no currently detected power level step change, algorithm 200 will further determine (at block 212) the length of time at which the machine has been operating within the specified speed range and the length of time for which the machine has not experienced a step change in output power. This length of time may be the same for both speed and power, or they may be different for each parameter.

In any case, if either or both of the times (the duration of machine operation within the specified speed range and the duration of machine operation since a previous step change in power output) do not exceed the minimum specified value(s) as indicated at block 214, then the binary steady state output value of the algorithm 200 is "False" as shown at block 216. However, if the times do exceed the specified minimum criteria, then the binary steady state output value of the algorithm 200 is "True" as shown at block 218.

Although the resulting steady state output value of algorithm 200 can be used for any of a number of purposes, FIG. 2 further illustrates an example of one such use. As discussed above, certain machine control algorithms are capable of detecting an alarm condition and generating an alarm signal to warn a system operator of the detected condition. As also stated above, such alarm conditions can be triggered even if a machine is presently in a transient state (e.g., power output step) that can cause normal operating parameters to temporarily deviate from a nominal range. Instead of "desensitizing" system operators to false alarms, the steady state output value of the system can instead be incorporated into the control system algorithm.

Accordingly, block 218 of FIG. 2 generally indicates the detection of an alarm condition through the main system control algorithm. Ordinarily, this determination would automatically trigger the signaling of an alarm condition to the operator. However, in this example the binary steady state output value of the algorithm 200 is inputted to block 220 to determine whether the value is true or false. If it is false, then the machine is not operating at the defined steady state conditions as set forth by the specific parameters of algorithm 200. Therefore, the detected alarm condition at 218 is deemed to be a false alarm at block 222 and no alarm signal is initiated. If, on the other hand, the machine is deemed to be in a steady state condition, the detected alarm condition is allowed to trigger an alarm signal, as shown in block 224.

Figure 3:
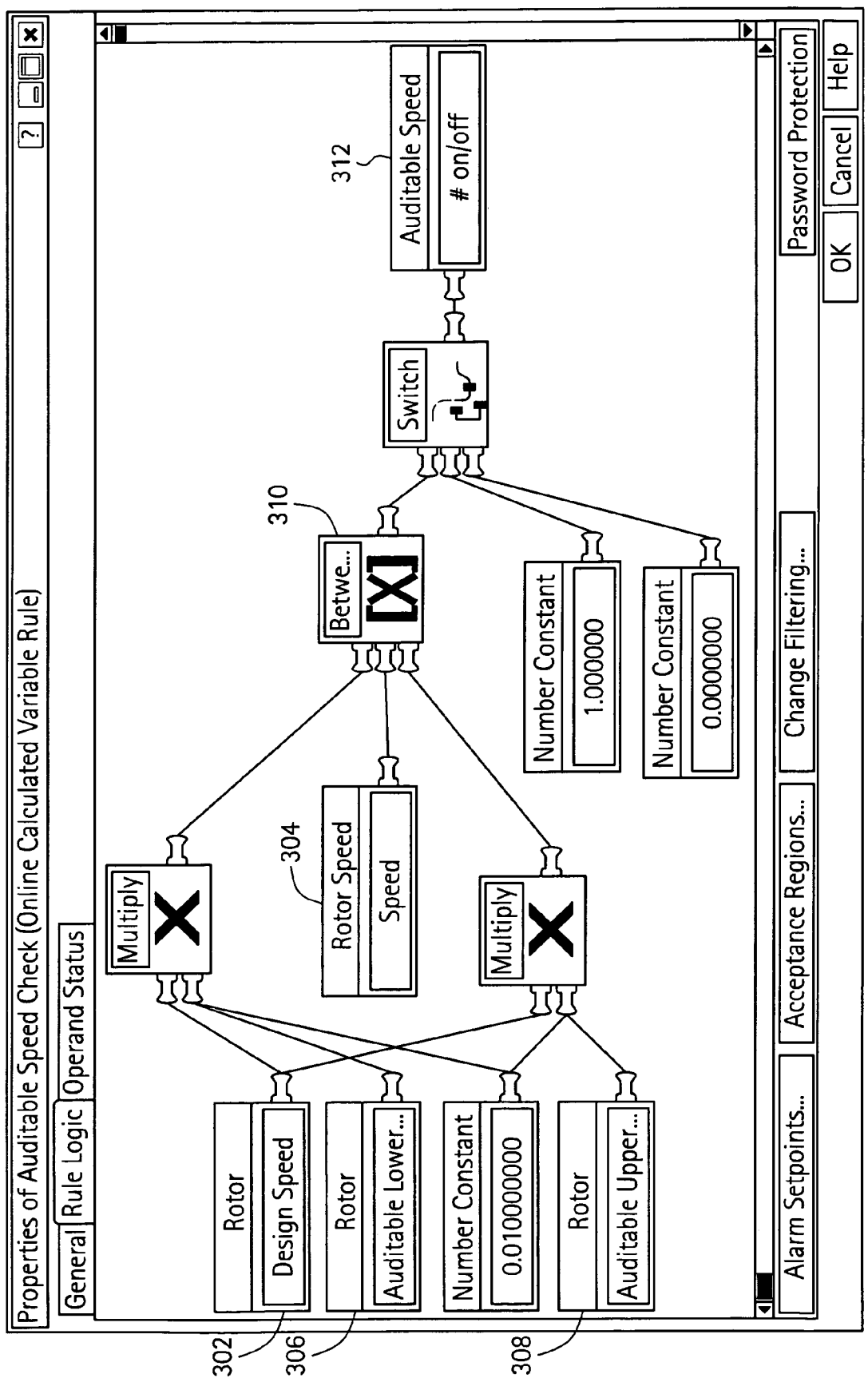
FIG. 3 is an exemplary computer screen capture illustrating one possible software implementation of the speed determination portion of the method of FIG. 2.

Referring now to FIG. 3, there is shown a computer screen capture 300 that illustrates one possible software implementation of the speed determination portion of algorithm 200. As is shown, the rule logic utilizes the rotor design speed 302 and actual speed 304 as inputs thereto. The specified operating percentage is also input to the rule logic in the form of lower and upper auditable values 306, 308, which are then multiplied by the design speed to calculate the lower and upper speed limits of the steady state range. A range comparison block 310 then determines whether the actual speed 304 is within the lower and upper range values. If so, the value of the binary auditable speed output 312 is true (e.g., logic 1) and, if not, then the value of binary auditable speed output 312 is false (e.g., logic 0). It will again be noted that whenever the value of binary auditable speed output 312 is false, the value of the steady state output value of the algorithm 200 is automatically false as well.

Figure 4:
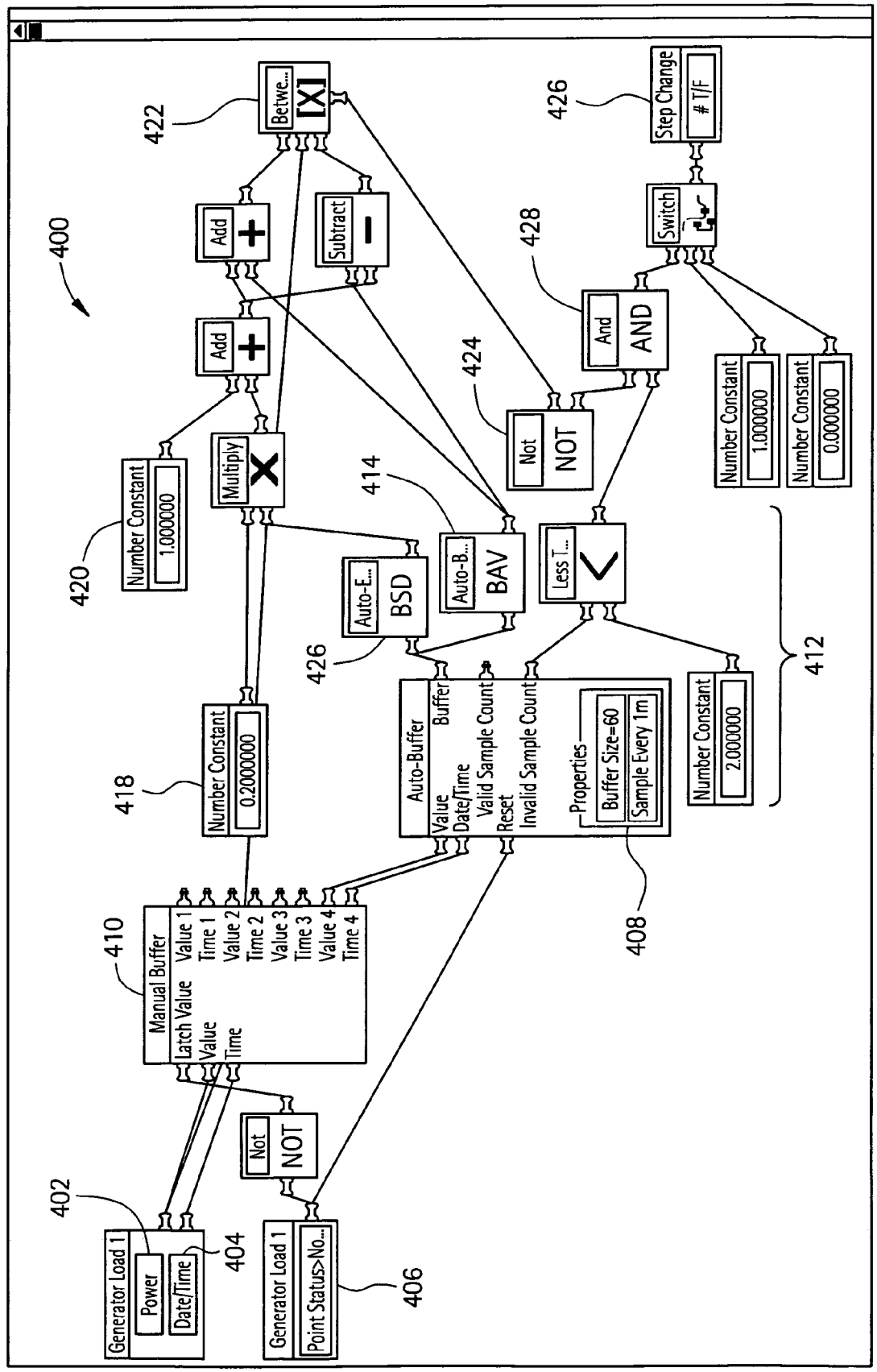
FIG. 4 is an exemplary computer screen capture that illustrating a power output step change determination portion of the method of FIG. 2.

FIG. 4 illustrates a computer screen capture 400 that illustrates one possible software implementation of the power output step change determination portion of algorithm 200. The rule logic utilizes the sensed output power 402 of the machine and date/time information 404 as inputs thereto. As mentioned previously, the step change in output power aspect of the steady state algorithm is considered over a period of time, and thus previously recorded power output values are stored in a buffer. In the embodiment depicted, there is also an input 406 to the rule logic that is indicative of whether the system is properly collecting the data. If not, then an auto buffer 408 is disabled (i.e., the stored values therein are reset) while a manual buffer latches 410 newly sampled power level/time values therein.

Optionally, a sample count interlock 412 may used to disable the entire rule if less than a determined minimum number of samples is present in the buffer. For example, if the buffer nominally holds 60 values therein, then the interlock 412 will only enable the rule logic in screen capture 400 if there are at least 58 valid samples therein. Obviously, a different threshold number of valid samples may be set for the rule logic.

In order to determine the existence of a valid step change in the sampled output power values, it is desirable to be able to distinguish between a "normal" variation in the output power values from an actual step change in output power values. In this regard, upper and lower bounds are dynamically determined for the output power, outside of which represents a step change in output power. In an exemplary embodiment, the upper and lower bounds are computed as a function of the average value (block 414) and the standard deviation (block 416) of the most recent output power values in the buffer 408. A first number constant (block 418) may be used to multiply the standard deviation value, while a second constant (block 420) is used to prevent the width between the upper and lower bounds from approaching zero as a result of the standard deviation of the buffered power output values approaching zero.

In lieu of standard deviation, other statistical measures of data variation may also be used in determining a power output step change. Additional information regarding the determination of a step change in a selected parameter may be found in Applicants' U.S. Patent Application Publication 2005/0246593.

A range comparison block 422 then determines whether the currently sensed output power 402 is within the lower and upper range values. A "true" output result from block 422 indicates no step change in power while a "false" output block from block 422 indicates a step change. An inverter block 424 is thus used to convert a step change conversion into a binary "true" output 426, provided the signal is enabled by the AND logic 428 (which again provides a valid sample number interlock).

Figure 5:
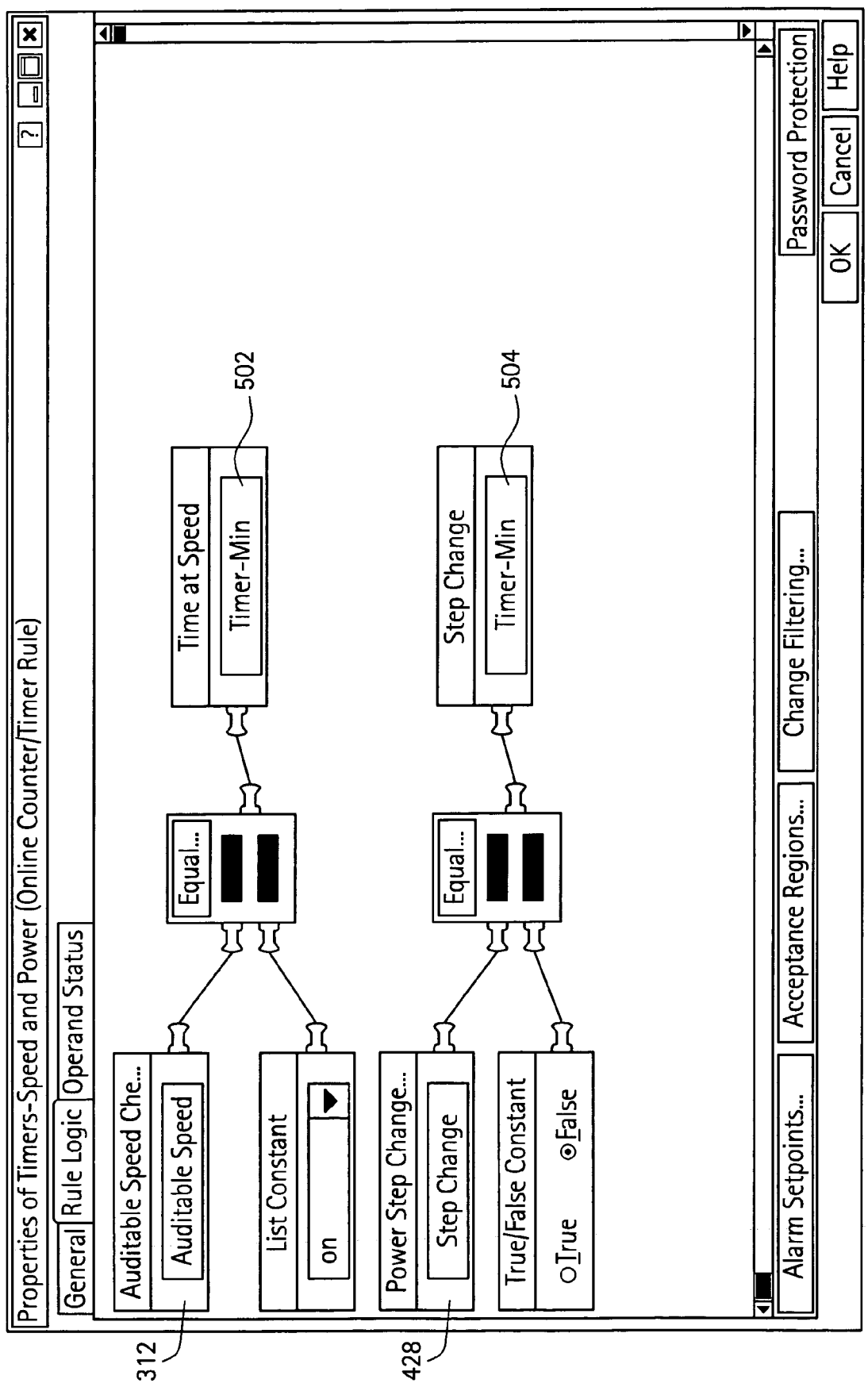
FIG. 5 is an exemplary computer screen capture illustrating a timing portion of the method of FIG. 2.

Referring now to FIG. 5, an exemplary screen shot 500 illustrates a timing portion of algorithm 200. As outlined above, the steady state criteria used in the algorithm 200 further considers the duration of time which the machine has been running at the speed within the determined design range (output 502), as well as the duration of time passed since the last detected power output step change (output 504). In the case of output 502, whenever the auditable speed output 312 (from FIG. 3) no longer equals "on" (i.e., the machine is no longer in the determined speed range), the output 502 of the speed timer is reset to zero and does not start again until the machine speed is back in the selected range. Similarly, in the case of output 504, whenever the power step change output 428 (from FIG. 4) no longer equals "False" (i.e., a step change has been detected), the output 504 of the step change timer is reset to zero and does not start again until the step change condition has ended.

Figure 6:
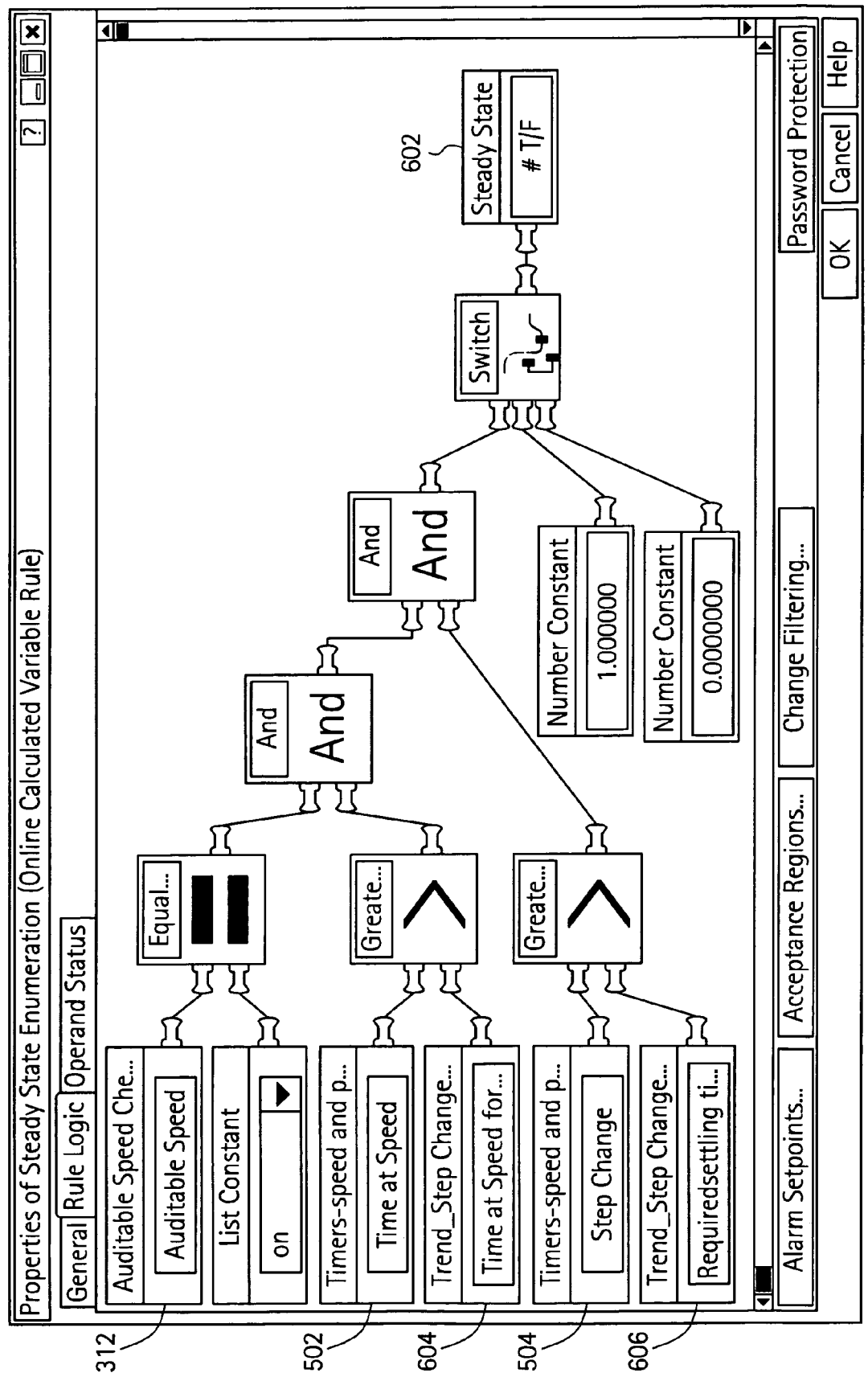
FIG. 6 is an exemplary computer screen capture illustrating the end portion of the method of FIG. 2 that generates the binary steady state output value.

Finally, FIG. 6 is an exemplary screen shot 600 illustrating the end portion of algorithm 200 that generates the binary steady state output value 602. As is shown, the end logic provides the AND comparison of the outputs of the earlier stages in FIG. 3 through 5. In particular, the steady state output value 602 is true whenever (1) the auditable speed output 312 is equal to "on" (i.e., operating within the determined range); and (2) the speed timer output 502 has also exceeded the user defined minimum duration of operation within the desired range (input 604); and (3) the step change timer output 506 has also exceeded the user defined minimum duration of operation since the last detected step change (input 606). Again, inputs 604 and 606 can be the same amount of time or they may be selected to be different values. If any of the above conditions are no longer satisfied, then the steady state output value 602 is no longer true.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 2 through 6.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a steady state operating condition of a machine, the method comprising:
   determining whether a current machine speed of the machine is within a defined range of operation;
   determining whether a step change in output power of the machine has occurred;
   determining a first duration of time elapsed since the machine speed was last outside of said defined range of operation; and
   determining a second duration of time elapsed since a most recent detected step change in output power of the machine;
   wherein the machine is deemed to be in a steady state condition whenever said current machine speed of the machine is within said defined range of operation, and said first and second durations of time exceed respective defined minimum values.

2. The method of claim 1, wherein said defined range of operation is based on a percentage of a rated design speed of the machine.

3. The method of claim 1, wherein said determination of a step change in output power of the machine further comprises comparing a current output power value of the machine falls within calculated upper and lower bounds.

4. The method of claim 3, wherein said upper and lower bounds are based upon an average value and a standard deviation of a plurality of previous output power values.

5. The method of claim 4, wherein said plurality of previous output power values are stored in a buffer.

6. The method of claim 5, wherein an affirmative step change determination is disabled whenever the number of valid previous output power values in said buffer is less than a defined amount.

7. The method of claim 4, further comprising applying a constant to prevent a difference between said upper and lower bounds from approaching zero.

8. A method for generating an alarm indication for a machine control system, the method comprising:
   detecting an alarm condition within the system;
   determining whether a machine controlled by the control system is operating in a steady state condition; and
   initiating an alarm signal responsive to the detected alarm condition where the machine is operating in a steady state condition and preventing an alarm signal where the machine is not operating in a steady state condition, wherein said determination of said steady state condition further comprises:
   determining whether a current machine speed of the machine is within a defined range of operation;
   determining whether a step change in output power of machine has occurred;
   determining a first duration of time elapsed since the machine speed was last outside of said defined range of operation; and
   determining a second duration of time elapsed since a most recent detected step change in output power of the machine;
   wherein the machine is deemed to be in a steady state condition whenever said current machine speed of the machine is within said defined range of operation, and said first and second durations of time exceed respective defined minimum values.

9. The method of claim 8, wherein said defined range of operation is based on a percentage of a rated design speed of the machine.

10. The method of claim 8, wherein said determination of a step change in output power of the machine further comprises comparing a current output power value of the machine falls within calculated upper and lower bounds.

11. The method of claim 10, wherein said upper and lower bounds are based upon an average value and a standard deviation of a plurality of previous output power values.

12. The method of claim 11, wherein said plurality of previous output power values are stored in a buffer.

13. The method of claim 12, wherein an affirmative step change determination is disabled whenever the number of valid previous output power values in said buffer is less than a defined amount.

14. The method of claim 11, further comprising applying a constant to prevent a difference between said upper and lower bounds from approaching zero.

15. An apparatus for determining a steady state operating condition of a machine, comprising:
   a controller in communication with the machine, the controller configured for receiving a current machine speed and a current machine power output as inputs thereto, said algorithm further configured for determining whether said current machine speed is within a defined range of operation, determining whether a step change in output power of the machine has occurred, determining a first duration of time elapsed since said machine speed was last outside of said defined range of operation, and determining a second duration of time elapsed since a most recent detected step change in output power of the machine;

wherein the machine is deemed to be in a steady state condition whenever said current machine speed of the machine is within said defined range of operation, and said first and second durations of time exceed respective defined minimum values.

16. The apparatus of claim 15, wherein said defined range of operation is based on a percentage of a rated design speed of the machine.

17. The apparatus of claim 15, wherein said determination of a step change in output power of the machine further comprises comparing a current output power value of the machine falls within calculated upper and lower bounds.

18. The apparatus claim 17, wherein said upper and lower bounds are based upon an average value and a standard deviation of a plurality of previous output power values.

19. The apparatus of claim 18, wherein said plurality of previous output power values are stored in a buffer.

20. The apparatus of claim 19, wherein an affirmative step change determination is disabled whenever the number of valid previous output power values in said buffer is less than a defined amount.

21. The apparatus of claim 18, wherein the controller is further configured to apply a constant to prevent a difference between said upper and lower bounds from approaching zero.

22. A storage medium, comprising:
a machine readable computer program code for determining a steady state operating condition of a machine; and
instructions for causing a computer to implement a method, the method further comprising:
determining whether a current machine speed of the machine is within a defined range of operation;
determining whether a step change in output power of the machine has occurred;
determining a first duration of time elapsed since the machine speed was last outside of said defined range of operation; and
determining a second duration of time elapsed since a most recent detected step change in output power of the machine;
wherein the machine is deemed to be in a steady state condition whenever said current machine speed of the machine is within said defined range of operation, and said first and second durations of time exceed respective defined minimum values.

23. The storage medium of claim 22, wherein said defined range of operation is based on a percentage of a rated design speed of the machine.

24. The storage medium of claim 22, wherein said determination of a step change in output power of the machine further comprises comparing a current output power value of the machine falls within calculated upper and lower bounds.

25. The storage medium of claim 24, wherein said upper and lower bounds are based upon an average value and a standard deviation of a plurality of previous output power values.

26. The storage medium of claim 25, wherein said plurality of previous output power values are stored in a buffer.

27. The storage medium of claim 26, wherein an affirmative step change determination is disabled whenever the number of valid previous output power values in said buffer is less than a defined amount.

28. The storage medium of claim 25, further comprising applying a constant to prevent a difference between said upper and lower bounds from approaching zero.

* * * * *